(12) United States Patent
Fu et al.

(10) Patent No.: US 9,979,545 B2
(45) Date of Patent: *May 22, 2018

(54) METHOD AND APPARATUS FOR ACCELERATED AUTHENTICATION

(71) Applicant: Nokia Technologies Oy, Espoo (FI)

(72) Inventors: Yan Fu, Espoo (FI); Nadarajah Asokan, Espoo (FI); Ville Aarni, Frederick, MD (US)

(73) Assignee: Nokia Technologies Oy, Espoo (FI)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/604,134

(22) Filed: May 24, 2017

(65) Prior Publication Data

US 2017/0264437 A1 Sep. 14, 2017

Related U.S. Application Data

(63) Continuation of application No. 12/891,476, filed on Sep. 27, 2010, now Pat. No. 9,667,423.

(51) Int. Cl.
*H04L 29/06* (2006.01)
*H04L 9/32* (2006.01)

(52) U.S. Cl.
CPC .......... *H04L 9/3213* (2013.01); *H04L 9/3234* (2013.01); *H04L 63/083* (2013.01); *H04L 63/0428* (2013.01); *H04L 63/102* (2013.01)

(58) Field of Classification Search
USPC .......................................................... 726/5
See application file for complete search history.

(56) References Cited

U.S. PATENT DOCUMENTS 4,720,860 A    1/1988 Weiss
4,856,062 A    8/1989 Weiss
(Continued)

FOREIGN PATENT DOCUMENTS

AT    71754 T    2/1992
AU    6568686 A    6/1987
(Continued)

OTHER PUBLICATIONS

Office Action for corresponding Chinese Patent Application No. 201180046525.3, dated Jun. 30, 2015, with English-language summary, 6 Pages.

(Continued)

*Primary Examiner* — Jason Lee
(74) *Attorney, Agent, or Firm* — Ditthavong & Steiner, P.C.

(57) ABSTRACT

Techniques for accelerated authentication include receiving first data that indicates a first portion of user credentials for a first user but not a second portion. It is verified whether the first portion of user credentials is valid. If the first portion of user credentials is valid, then second data that indicates a valid value for the second portion of user credentials for the first user is sent. Other techniques include receiving first data that indicates a first portion of user credentials for a first user but not a second portion of user credentials for the first user. A first message that indicates the first portion of user credentials is sent to a remote process that initiates authentication of the first user based on the first portion of user credentials before receiving second data that indicates the second portion of user credentials for the first user.

15 Claims, 12 Drawing Sheets

(56) References Cited

U.S. PATENT DOCUMENTS

| | | |
|---|---|---|
| 4,885,778 A | 12/1989 | Weiss |
| 4,998,279 A | 3/1991 | Weiss |
| 5,023,908 A | 6/1991 | Weiss |
| 5,058,161 A | 10/1991 | Weiss |
| 5,168,520 A | 12/1992 | Weiss |
| 5,237,614 A | 8/1993 | Weiss |
| 5,367,572 A | 11/1994 | Weiss |
| 5,479,512 A | 12/1995 | Weiss |
| 5,485,519 A | 1/1996 | Weiss |
| 6,842,860 B1 | 1/2005 | Branstad et al. |
| 7,228,291 B2 | 6/2007 | Seamons et al. |
| 7,360,096 B2 | 4/2008 | Bracewell et al. |
| 7,886,346 B2 | 2/2011 | Sandhu et al. |
| 2004/0098609 A1* | 5/2004 | Bracewell ............ H04L 63/068 726/6 |
| 2004/0117330 A1* | 6/2004 | Ehlers ................. F24F 11/0012 705/412 |
| 2004/0177280 A1 | 9/2004 | Maruyama et al. |
| 2006/0020679 A1 | 1/2006 | Hinton et al. |
| 2006/0021018 A1 | 1/2006 | Hinton et al. |
| 2006/0095957 A1 | 5/2006 | Lundblade et al. |
| 2007/0136792 A1* | 6/2007 | Ting ........................ G06F 21/32 726/5 |
| 2007/0160076 A1* | 7/2007 | Faber ................... H04L 63/083 370/461 |
| 2009/0006861 A1* | 1/2009 | Bemmel ................. G06F 21/31 713/189 |

FOREIGN PATENT DOCUMENTS

| | | |
|---|---|---|
| AU | 587087 B2 | 8/1989 |
| AU | 7981691 A | 5/1992 |
| AU | 649190 B2 | 5/1994 |
| AU | 2003257894 A1 | 6/2004 |
| BR | 0305140 A | 8/2004 |
| CA | 2094026 A1 | 4/1992 |
| CA | 2450056 A1 | 5/2004 |
| CN | 1505309 A | 6/2004 |
| CN | 101175094 A | 5/2008 |
| CN | 101179373 A | 5/2008 |
| CN | 101521884 A | 9/2009 |
| DE | 555219 T1 | 11/1996 |
| DE | 69133047 T2 | 11/2002 |
| EP | 0234100 A2 | 9/1987 |
| EP | 0555219 B1 | 6/2002 |
| EP | 1422907 A2 | 5/2004 |
| EP | 1816821 A1 | 8/2007 |
| ES | 2029450 T3 | 8/1992 |
| JP | S6324384 A | 2/1988 |
| JP | H06507277 A | 8/1994 |
| JP | 2004173285 A | 6/2004 |
| KR | 20040044375 A | 5/2004 |
| MX | PA03010477 A | 10/2004 |
| RU | 2003133768 A | 5/2005 |
| RU | 2008114665 A | 10/2009 |
| WO | 9207436 A1 | 4/1992 |
| WO | 2009048191 A1 | 4/2009 |

OTHER PUBLICATIONS

Office Action for corresponding Chinese Patent Application No. 201180046525.3, dated Dec. 2, 2014, with English-language summary, 18 Pages.
International Search Report for corresponding International Patent Application No. PCT/FI2011/050798, dated Nov. 25, 2011, pp. 1-4.
International Written Opinion for corresponding International Patent Application No. PCT/FI2011/050798, dated Nov. 25, 2011, pp. 1-6.
Wikipedia, "Authenticated Encryption", Oct. 31, 2010, http://en.wikipedia.org/wiki/Authenticated_encryption, pp. 1-2.
"Developers—Glossary", Trusted Computing Group, accessed on: Nov. 11, 2010, http://www.trustedcomputinggroup.org/developers/glossary, pp. 1-6.

* cited by examiner

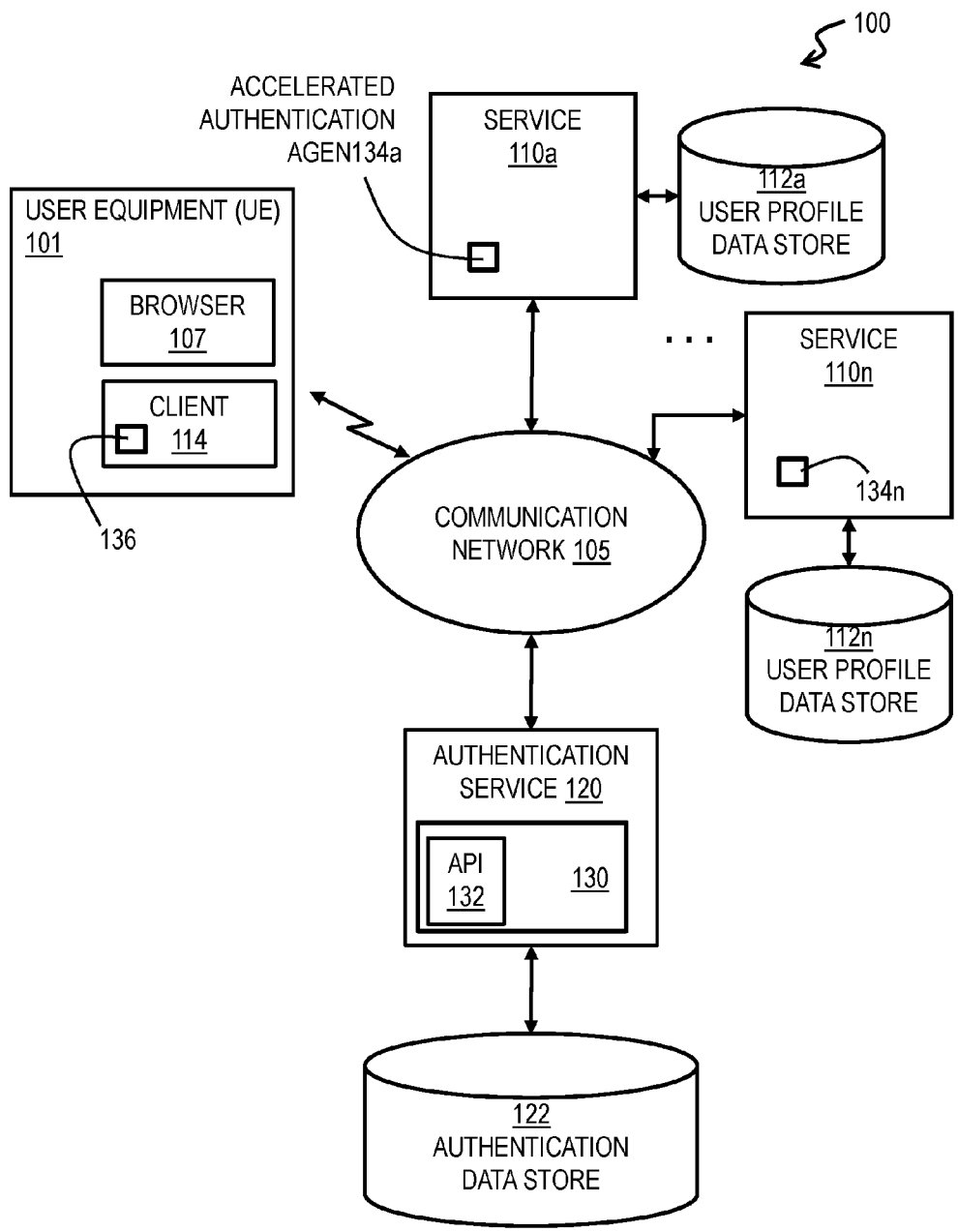

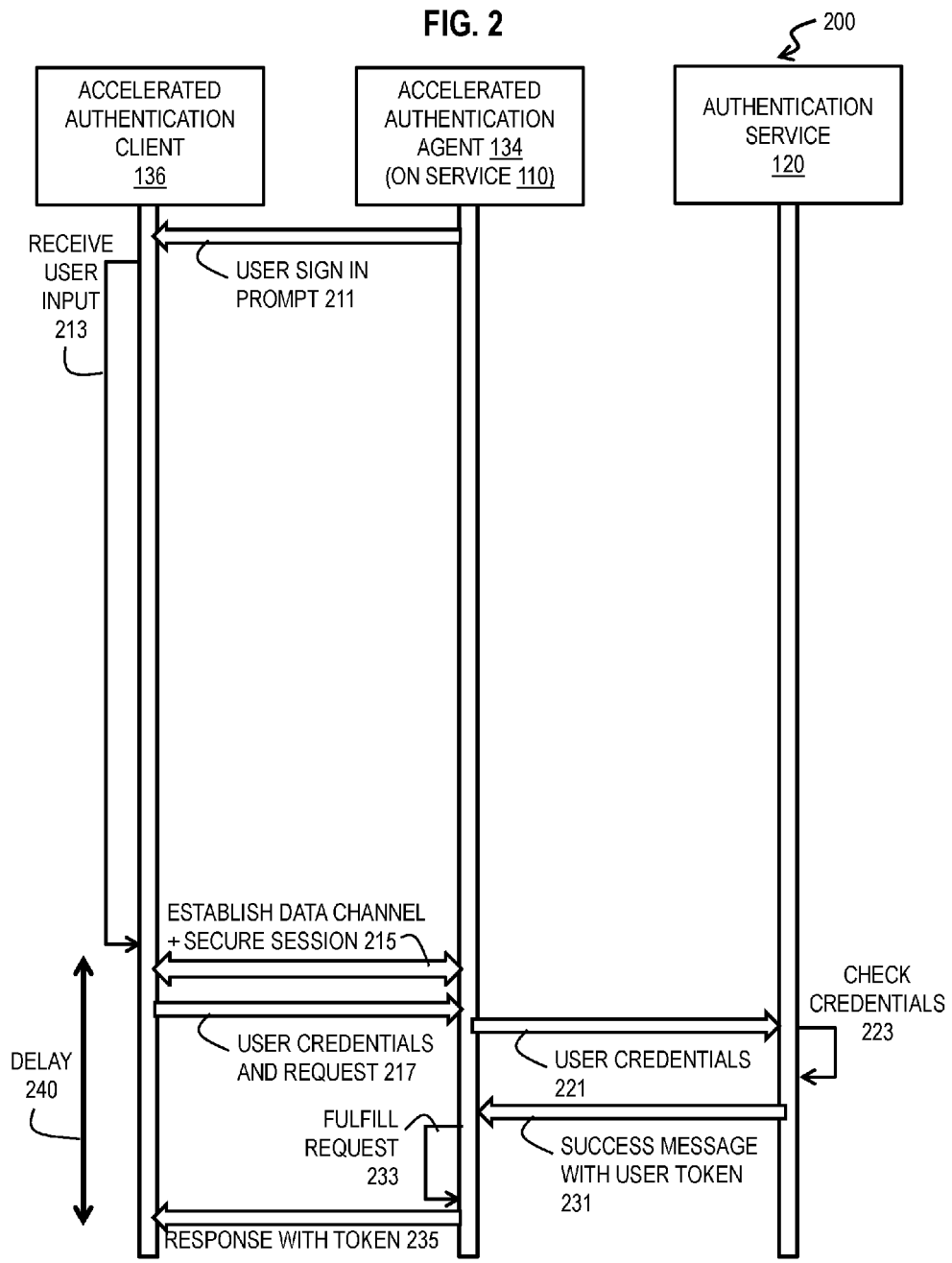

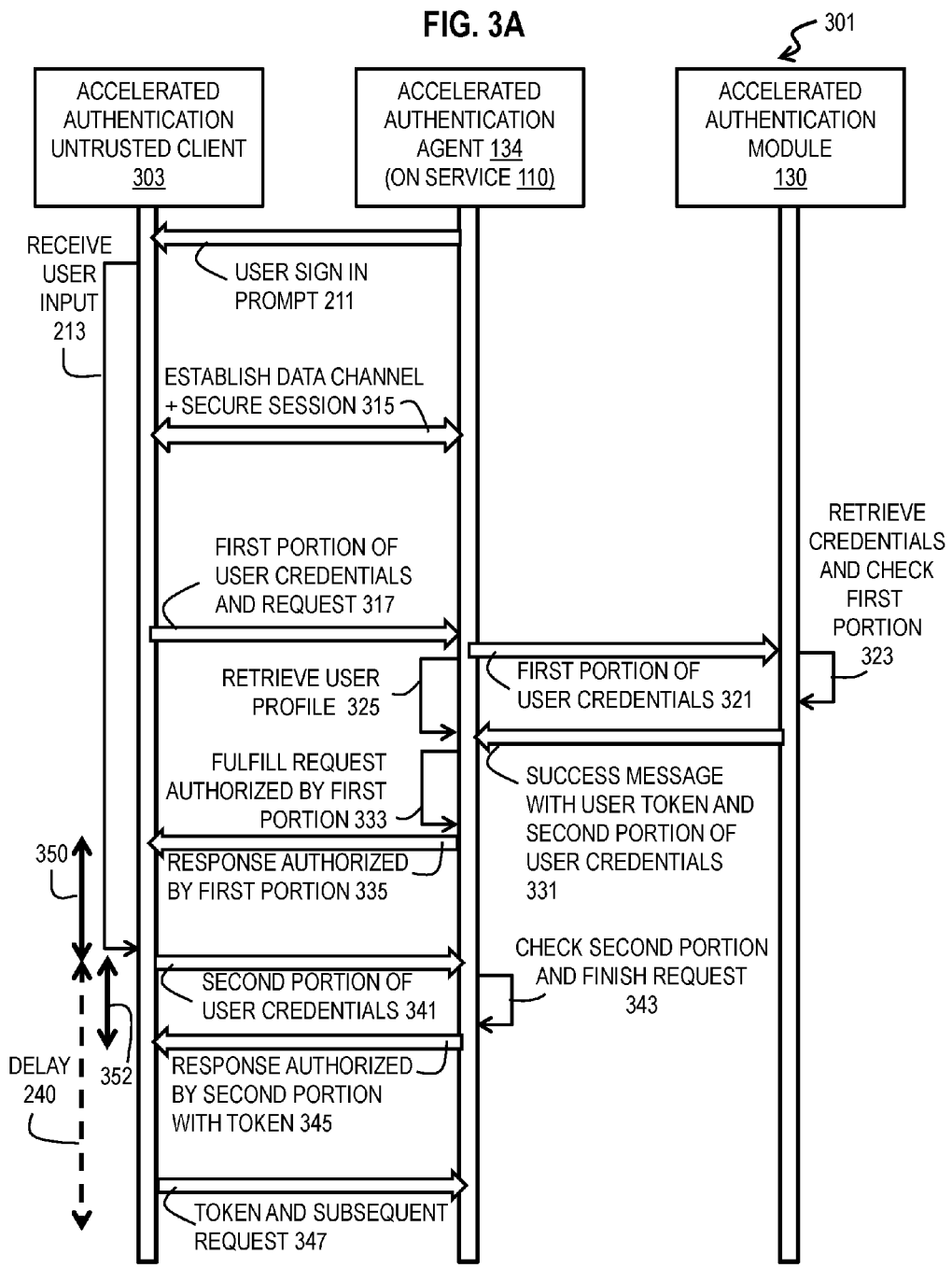

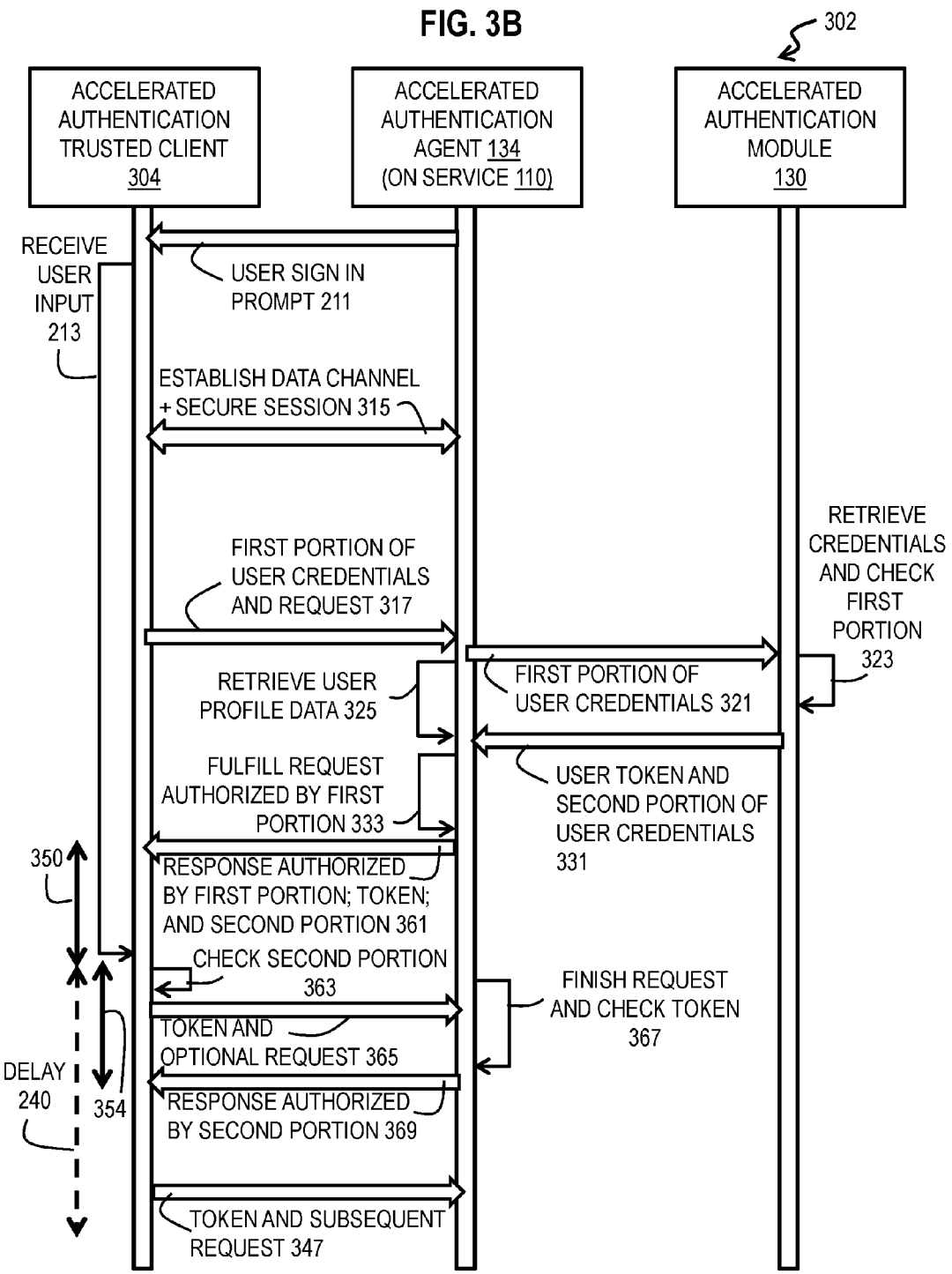

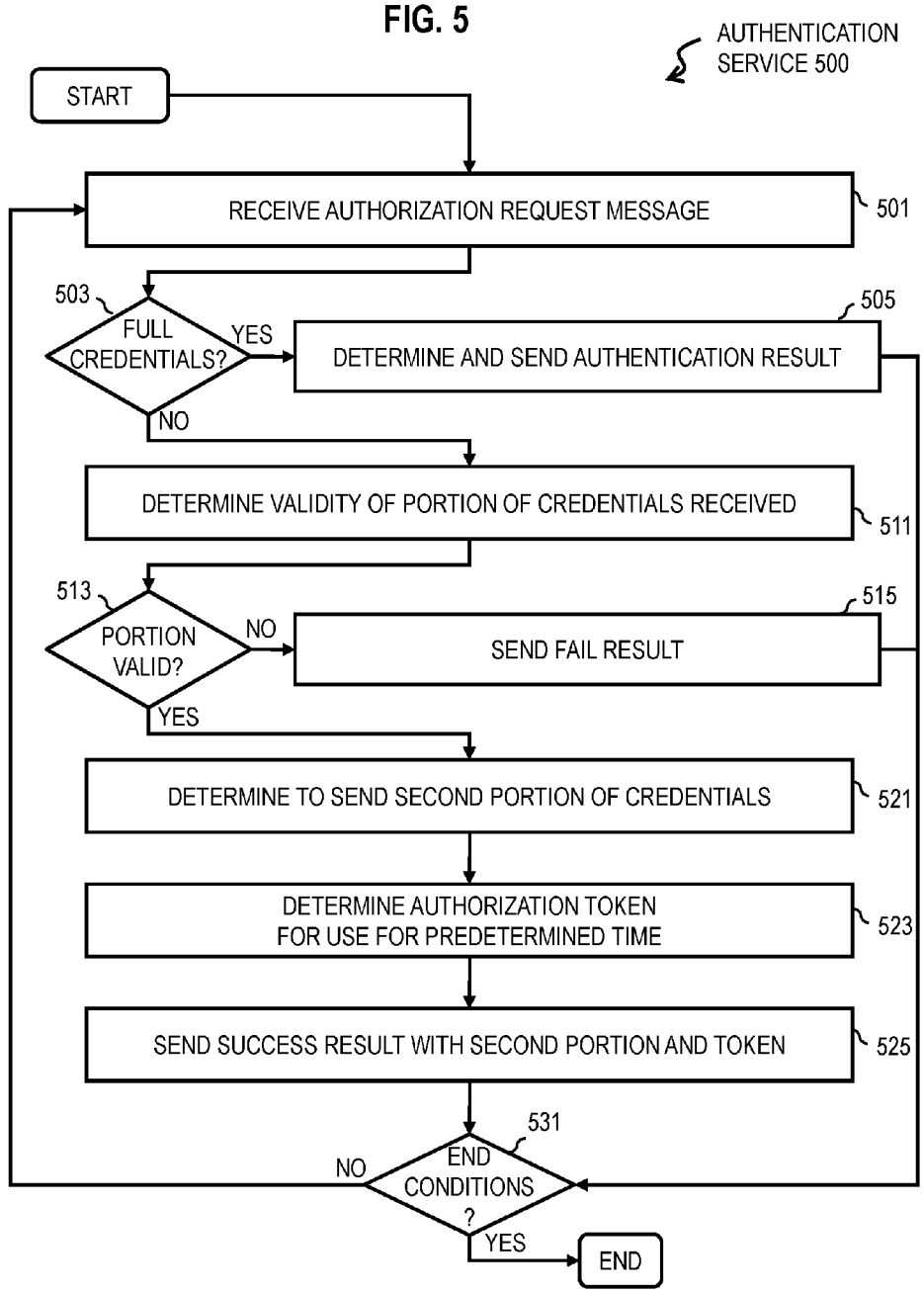

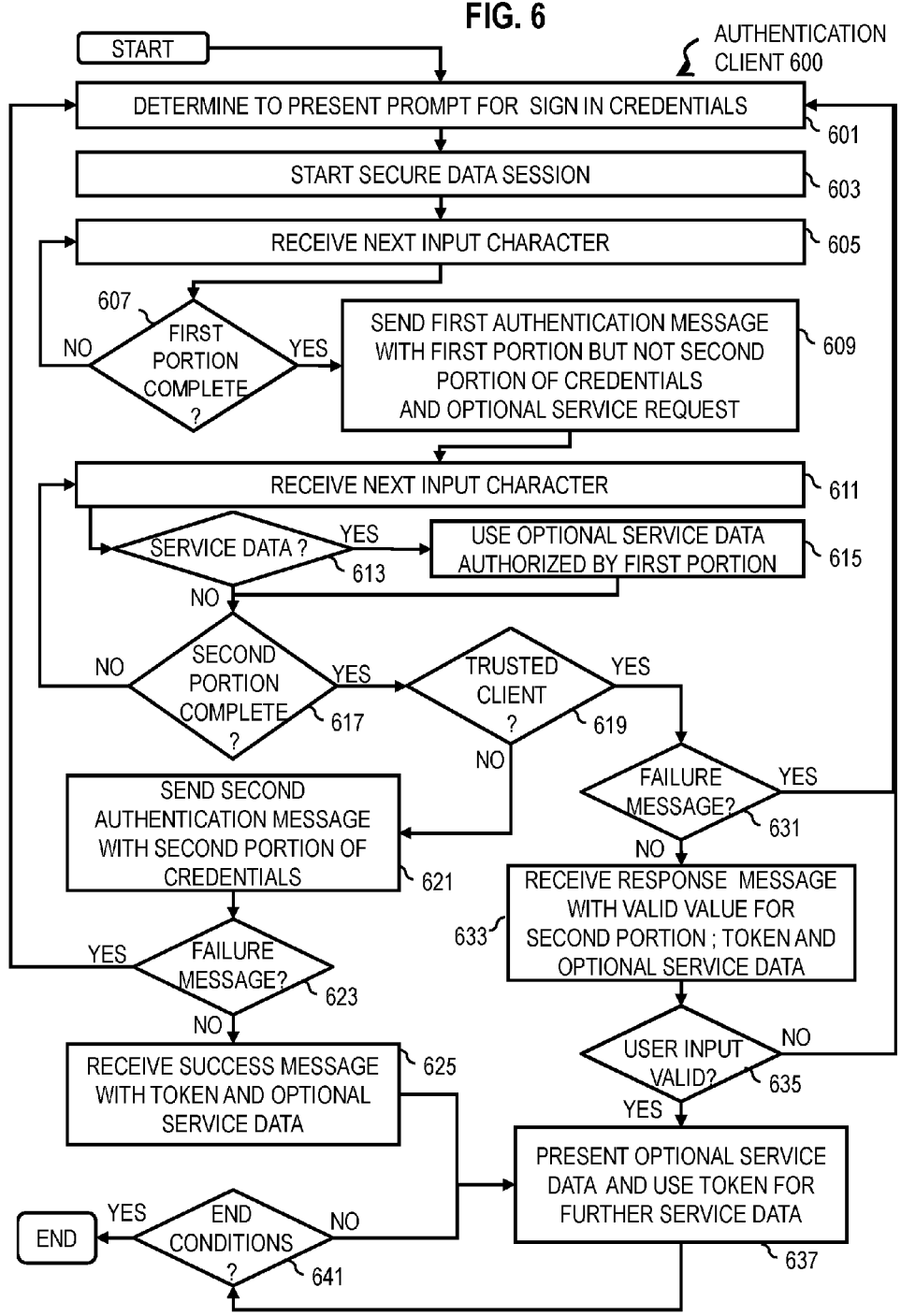

METHOD AND APPARATUS FOR ACCELERATED AUTHENTICATION

CROSS REFERENCE TO RELATED APPLICATION

This application is a Continuation of U.S. application Ser. No. 12/891,476, filed Sep. 27, 2010 and entitled "Method and Apparatus for Accelerated Authentication", the contents of which are incorporated herein by reference in its entirety.

BACKGROUND

Service providers and device manufacturers (e.g., wireless, cellular, etc.) are continually challenged to deliver value and convenience to consumers by, for example, providing compelling network services. Many consumer network services require user authentication for providing user specific content and services. A user is prompted to fill in a username, a password and possibly other information on some dedicated authentication user interface in a client application. When the user has provided all such information, the client application submits it, or a transformation of it, in a secure communication channel over the network to an authentication service. The authentication server verifies the information against an authentication database. If successful, the authentication server returns an access token that can be used to obtain the network services for a predetermined time. This process is a lengthy one because: it takes typically several seconds for the user to fill in the authentication user interface, especially on mobile devices with small or onscreen keyboards; it also takes typically a few seconds to set up a data channel on mobile telephones and then to establish a secure session with the network service due to multiple roundtrips between the client and the server; it takes several hundred milliseconds for the authentication service to locate the user's information in a database that usually consists of millions of users; and it takes several hundred milliseconds for the network service to fulfill the request that is made by the client application just after a successful authentication. The last two components often take extra time when the services or equipment which host the network and authentication services are busy. During this lengthy process, the user's device is less available for performing other user initiated functions, thus wasting processing capacity and bandwidth on the user's device.

SOME EXAMPLE EMBODIMENTS

Therefore, there is a need for an approach for accelerated authentication and service response.

According to one embodiment, a method comprises receiving first data that indicates a first portion of user credentials for a first user but not a second portion of user credentials for the first user. User credentials are used to authenticate a user. The method also comprises determining to send a first message that indicates the first portion of user credentials to a remote process that initiates authentication of the first user based on the first portion of user credentials before receiving second data that indicates the second portion of user credentials for the first user.

According to another embodiment, a method comprises receiving first data that indicates a first portion of user credentials for a first user but not a second portion of user credentials for the first user. The method also comprises determining whether the first portion of user credentials is valid. The method further comprises determining to send second data that indicates a valid value for the second portion of user credentials for the first user, if the first portion of user credentials is valid.

According to another embodiment, a method comprises facilitating access to at least one interface configured to allow access to at least one service, the at least one service configured to perform at least the steps of one of the above methods.

According to another embodiment, an apparatus comprises at least one processor, and at least one memory including computer program code, the at least one memory and the computer program code configured to, with the at least one processor, cause, at least in part, the apparatus to at least perform the steps of one of the above methods.

According to another embodiment, an apparatus comprises means for at least performing each step of one of the above methods.

According to another embodiment, a computer-readable storage medium carries one or more sequences of one or more instructions which, when executed by one or more processors, cause, at least in part, an apparatus to at least perform the steps of one of the above methods.

According to another embodiment, a computer program product comprises one or more sequences of one or more instructions which, when executed by one or more processors, cause an apparatus to at least perform the steps of one of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of accelerated authentication, according to one embodiment;

FIG. 2 is a time sequence diagram of authentication for a user a network service, according to one embodiment;

FIG. 3A is a time sequence diagram of accelerated authentication, according to another embodiment;

FIG. 3B is a time sequence diagram of accelerated authentication, according to another embodiment;

FIG. 5 is a flowchart of an accelerated authentication service process, according to one embodiment;

FIG. 6 is a flowchart of an accelerated authentication client process, according to one embodiment;

DESCRIPTION OF SOME EMBODIMENTS

Figure 4A:
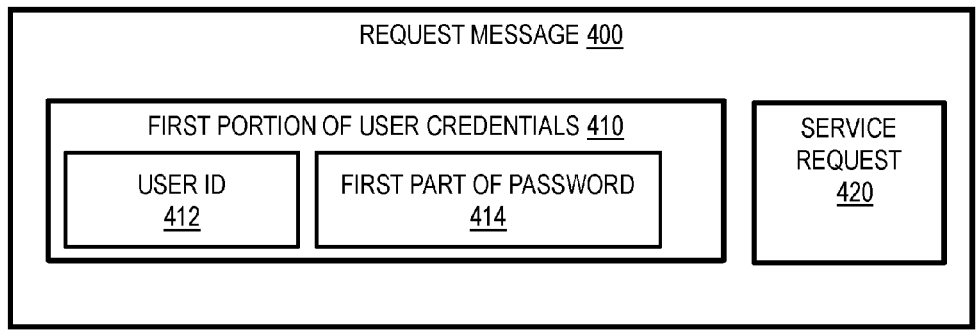
FIG. 4A is a diagram of a service request message, according to one embodiment.

Examples of a method, apparatus, and computer program are disclosed for accelerated authentication. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system 100 capable of accelerated authentication, according to one embodiment. Many consumer network services 110a through 110n (collectively referenced hereinafter as network services 110) request user authentication for providing user specific content and services. A user is prompted to fill in a username, a password and possibly other information, together constituting user credentials, on some dedicated authentication user interface (UI) in a client application 114 or World Wide Web browser 107 on user equipment 101. When the user has provided all such information, the client application or browser submits it, or a transformation of it, in a secure communication channel over the network 105 to an authentication service 120, either directly or indirectly through a corresponding network service 110. The authentication service 120 verifies the information against an authentication data store 122, such as a database. If successful, the authentication service 120 returns an access token that can be used to obtain the services form one or more of network services 110 for a predetermined time. This process is lengthy, as described in an earlier section, especially if one or more of the network service 110 or authentication service 120 is busy or the network 105 is congested. This process is even lengthier for mobile devices that first take time to establish a data network with a wireless base station and then take additional time to set up a secure session over that data channel, e.g., using the Transport Layer Security (TLS) protocol. During this lengthy process, the user's device, e.g., UE 101, is less available for performing other user initiated functions, thus wasting processing capacity and bandwidth on the UE 101. Personalized services provided by network services 110 to a user of UE 101 are determined to some degree by user profile data stored in a user profile data stores 112a through 112n (collectively referenced hereinafter as user profile data store 112) in network services 110a through 110n, respectively. As the authentication data store 122 or the user profile data stores 112 become large, further time is taken to search those data stores to provide authentication or other personalized services.

To address this problem, the system 100 of FIG. 1 introduces the capability to accelerate authentication for a network service by configuring an accelerated authentication module 130, or accelerated authentication agent 134a through 134n (collectively referenced hereinafter as accelerated authentication agent modules 134) in network services 110a through 110n, respectively, or an accelerated authentication client 136, or some combination, to perform one or more authentication or network service functions, or both, while the user is still entering credentials at the UE 101. In some embodiments, one or more functions of the accelerated authentication module 130 are accessed through an application programming interface 132.

As shown in FIG. 1, the system 100 comprises user equipment (UE) 101 having connectivity to network services 110 and authentication service 120 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, network services 110 and authentication service 120 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. For example, the TLS protocol includes encrypted payloads; and, is encapsulated in the Transmission Control Protocol (TCP). The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Processes executing on various devices, often communicate using the client-server model of network communications, widely known and used. According to the client-server model, a client process sends in one or more data packets a message including a request to a server process (also called a service), and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" and "service" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most devices (called nodes) connected to a communications network is a World Wide Web client (called a "web browser," or simply "browser") that interacts through messages formatted according to the hypertext transfer protocol (HTTP) with any of a large number of servers called World Wide Web (WWW) servers that provide web pages.

As depicted in FIG. 1, the UE 101 includes browser 107. The UE 101 also includes a client application 114 (hereinafter referenced as client 114) that interacts with one or more of the network services 110.

By way of example, the modules 130, 134 and 136 include one or more components for providing accelerated authentication. It is contemplated that the functions of these components may be combined in one or more components or performed by other components of equivalent functionality, on the same or different hosts connected to network 105.

Although services 110, 120, clients 114, and data structures 112 and 122 are shown as integral blocks in a particular arrangement at particular nodes of the network 105 for purposes of illustration, in other embodiments, one or more processes or data structures, or portions thereof, are arranged in a different order on the same or different or different number of nodes connected to the network, e.g., a data store 112 or 122 is arranged in one or more databases.

FIG. 2 is a time sequence diagram 200 of authentication for a user a network service, according to one embodiment. In time sequence diagrams time increases downward (not to scale), an individual network process is represented by vertically elongated boxes labeled by rectangles at the top. A message sent from one process to another is indicated by a horizontal arrow pointing from the sending process to the receiving process. A step at a single process is indicated by a segmented arrow looping back on the process at a vertical position indicative of the relative time when the step occurs. The processes represented in FIG. 2 include accelerated authentication client 136 in client 114, accelerated authentication agent 134 in network service 110, and authentication service 120.

In the illustrated embodiment, some acceleration is provided by including a request for service with a message requesting authentication. No change is made to the authentication service 120.

Figure 7A:
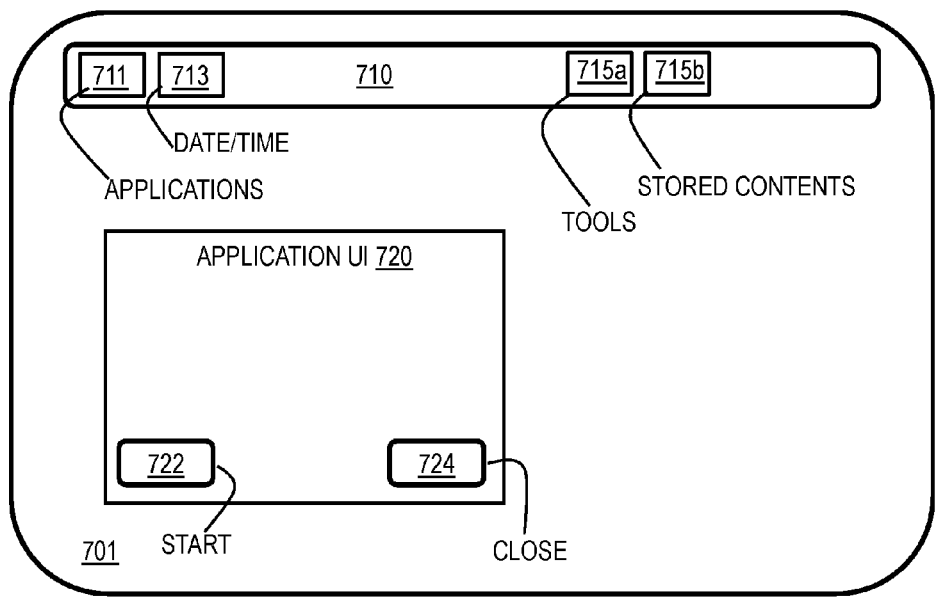
FIGS. 7A-7B are diagrams of user interfaces utilized in the processes, according to various embodiments.
Figure 7B:
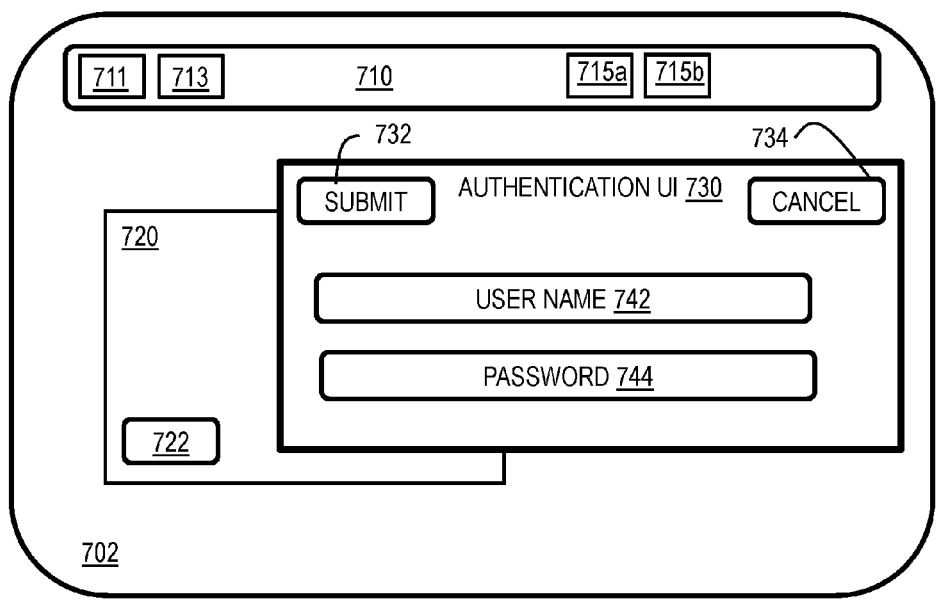

After a user contacts a service 110 for personalized services, e.g., through a browser 107 or client 114, a user sign-in prompt is sent to the browser or client in message 211 comprising one or more data packets. The message is intercepted by, or forwarded to, the accelerated authentication client 136, which presents authentication user interface (UI). FIGS. 7A-7B are diagrams of user interfaces utilized in the processes, according to various embodiments.

FIG. 7A is a diagram that illustrates an example screen 701 presented at UE 101. The screen 701 includes a device toolbar 710 portion of a display, which includes zero or more active areas. As is well known, an active area is a portion of a display to which a user can point using a pointing device (such as a cursor and cursor movement device, or a touch screen) to cause an action to be initiated by the device that includes the display. Well known forms of active areas are stand alone buttons, radio buttons, pull down menus, scrolling lists, and text boxes, among others. Although areas, active areas, windows ad tool bars are depicted in FIG. 7A through FIG. 7B as integral blocks in a particular arrangement on particular screens for purposes of illustration, in other embodiments, one or more screens, windows or active areas, or portions thereof, are arranged in a different order, are of different types, or one or more are omitted, or additional areas are included or the user interfaces are changed in some combination of ways.

For purposes of illustration, it is assumed that the device toolbar 710 includes active areas 711, 713, 715a and 715b. The active area 711 is activated by a user to display applications installed on the UE 101 which can be launched to begin executing, such as an email application or a video player. The active area 713 is activated by a user to display current context of the UE 101, such as current date and time and location and signal strength. In some embodiments, the active area 713 is a thumbnail that depicts the current time, or signal strength for a mobile terminal, or both, that expands when activated. The active area 715a is activated by a user to display tools built-in to the UE, such as camera, alarm clock, automatic dialer, contact list, GPS, and web browser. The active area 715b is activated by a user to display contents stored on the UE, such as pictures, videos, music, voice memos, etc.

The screen 701 also includes an application user interface (UI) area 720 in which the data displayed is controlled by a currently executing application, such as a local application like a game or a client 114 of a network service 110 or a browser 107. According to some embodiments, the application UI area 720 includes a START button 722 and a CLOSE button 724.

If the user activates the CLOSE button 724, the application UI area 720 is closed. If the user activates the START button 722, an authentication user interface (UI) is presented. FIG. 7B is a diagram that illustrates an example screen 702 presented at UE 101. Screen 702 includes the device toolbar 710 portion, as described above and a portion of the application UI area 720, as well as an authentication user interface (UI) area 730.

The authentication UI area 730 includes an SUBMIT button 732 and a CANCEL button 734, a USER NAME text box 742 and a PASSWORD text box 744. If the user activates the CANCEL button 734, the authentication UI area 730 is closed. If the user enters a user name into the USER NAME text box 742 and enters a password into the PASSWORD text box 724 and presses the SUBMIT button, the user credentials are passed by the client 114 to the network service 110 or authentication service 120. In the illustrated embodiment, a request for the service is also included in the message that is sent to the service 110. In some embodiments, the SUBMIT button is deactivated (as indicated for example by graying out the button 732) unless and until the user enters at least a minimum number of characters into each of the text boxes 742 and 744.

Returning to FIG. 2, the process to present the authentication UI area 732 and receive user activation of the submit button 732 is indicated by a receive user input process 213, and represents several seconds, e.g., about five to ten seconds.

At the end of the process a secure connection is set up, e.g., using one or more of Internet Protocol Security (IPsec), Secure Shell (SSH), Secure Sockets Layer (SSL) or Transport Layer Security (TLS) protocols, among others, in one or more messages 215. For cellular telephones, the messages 215 include those exchanged with an access provider base station to establish a data channel, over which the secure connection is set up. These messages can consume hundreds to thousands of milliseconds.

The full user credentials and service request are sent to the agent 134 (via service 110) in message 217 comprising one or more data packets. The agent 134 causes the full user credentials to be sent to the authentication service 120 in message 221. The authentication service 120 checks the user credentials against the contents of the authentication data store 122 in process 223 that can take hundreds of milliseconds. If the credentials fail (e.g., do not match, or match a blocked or deadbeat user's credentials), then a failure message (not shown) is sent to the client 136, either directly or through the agent 134 which sends a rejection message (not shown) to the client for presentation to the user. In some embodiments, the messages 215 include a redirect of the client 136 to the authentication service 120 and message 217 is passed directly to the service 120 and the fail message or success message is passed directly to the client 136. For purposes of illustration, it is assumed that the messages between client 136 and authentication service 120 pass through the agent 134.

If the credentials succeed (i.e., do not fail), then a success message 231 is returned. In the illustrated embodiment, the success message includes a user token. A user token is data that is used by the first user to obtain service from a set of one or more network services for a predetermined time interval, e.g., for four hours. For example, in some embodiments, the user token is stored by the authentication service 120 in authentication data store 122 for its lifetime; the user token section of the data store is searched more quickly than full user credentials. In further request messages from the same user for service from one or more related services 110 (e.g., related in that they share user authentication credentials), the user token is included and compared against the tokens that are still alive in the data store 122. In some embodiments, the user token is retained by the service 110 for the lifetime of the token and used to authenticate further messages that include the token.

In the illustrated embodiment, upon receipt of the success message 231 at agent 134, the service request included in the messages 217, if any, is fulfilled during process 233. For example, the user's home page on service 110 is assembled for delivery to the client 114 or browser 107. The service response for the request and the user token are sent to the client 114 or browser 107, e.g., via the accelerated authentication client 136. The time from when the user presses submit button 732 until the response to the service request is received in message 235 is the delay 240.

In the illustrated embodiment, the service request is fulfilled in process 233 before the token is delivered to the accelerated authentication client 136. In previous approaches, only the user token is included in the message 235; and, a separate request message (not shown) is sent with the user token to initiate the process 233. After that, the request is fulfilled at the service 110 in process 233; and, subsequently, the service request response, e.g., the user home page, is delivered to the client in yet another response message (not shown). This additional exchange adds additional time, resulting in a delay even greater than delay 240. Thus, delay 240 represents an accelerated authentication process according to some embodiments.

In other embodiments, even further acceleration is provided, resulting in delays substantially reduced from delay 240, as described in more detail below with reference to FIG. 3A for an untrusted client and FIG. 3B for a trusted client. A trusted client is one that is sure to perform an expected function, e.g., one executing machine code that cannot be reasonably altered by a user of UE 101 and which was sent by the service 110.

FIG. 3A is a time sequence diagram 301 of accelerated authentication, according to one embodiment. The processes represented in FIG. 3A include an untrusted client 303 serving as accelerated authentication client 136 in client 114, accelerated authentication agent 134 in network service 110, and accelerated authentication module 130 in authentication service 120. In this embodiment, the accelerated authentication module 130 checks only a first portion of the full user credentials, wherein the first portion excludes a second portion of the full user credentials. Furthermore, the accelerated authentication module 130 provides the second portion of the user credentials if the first portion does not fail the check.

For purposes of illustration, it is assumed that the first portion includes the user name (e.g., all the characters entered in USER NAME text box 742) and a first part of the password (e.g., the first four characters of the text entered in PASSWORD text box 744) but does not include a second part of the password (e.g., the fifth through final characters of the text entered in PASSWORD text box 744). In other embodiments, the first portion is defined in other ways.

An advantage of including the full user name and part of the password is to hinder attacks to discover user credentials by guessing the first portion. However, in some embodiments where increased acceleration is valued over protection from such attacks, the first portion includes fewer characters. For example, in various embodiments, the first portion includes just the user name, or just a first part of the user name, e.g., the first five characters of the user name. In some of these embodiments, the first portion is not a predetermined number of characters; for example, in some of these embodiments the first portion includes only the characters entered up to a time when the user hesitates while entering characters.

An advantage of including in the first portion a full user name, which is typically unique among all users of one or more service 110, is that the authentication of only a single user is considered. Including less than the full user name means that, at least in some cases, the user to be authenticated is ambiguous and, in embodiments that use a first portion with less than the full username, several candidate users are considered. In some embodiments, the ambiguity is reduced using context information, such as location of the base station for the user equipment and time of day, but this consumes extra processing that may impede the desired acceleration.

User sign in prompt messages 211 and receive user input process 213 are as described above for FIG. 2. Unlike the messages 215 to establish the data channel and secure session in the sequence depicted in FIG. 2, in FIG. 3A the messages 315 to establish the data channel and secure session begin well before the process 213 is completed, i.e., well before the user activates the SUBMIT button 732.

Also before the process 213 is completed, the first portion of the user credentials and the request for service are included in one or more messages 317 sent to the agent 134 on service 110. In the illustrated embodiment, the messages 317 are sent as soon as the user provides the first portion. For example, the accelerated authentication client 136 captures each character typed into the USER NAME text box 742 and into the PASSWORD text box 744. As soon as the first part of the password is complete, e.g., as soon as the fourth character is typed in PASSWORD text box 744, the messages 317 are sent. In some embodiments, the messages 317 include a first message for the full username and separate messages for each character typed into the PASSWORD text box 744. In some embodiments, the messages 317 include a first message for a part of the full username and separate messages for each subsequent character typed into the USER NAME text box 742 and PASSWORD text box 744. In some embodiments, the messages 317 include separate messages for each character typed into the USER NAME text box 742 and PASSWORD text box 744.

FIG. 4A is a diagram of a service request message 400, according to one embodiment. Service request message 400 is a particular embodiment of messages 317. Although messages and fields are shown in FIG. 4A, and subsequent diagrams FIG. 4B and FIG. 4C, as integral blocks in a particular order for purposes of illustration, in other embodiments, one or more fields, or portions thereof, are arranged in a different order in the same or different or different number of messages or are omitted, or one or more additional fields are added, or the message is changed in some combination of ways. As depicted, the request message 400 includes a first portion of user credentials field 210 and a service request field 420.

The first portion of user credentials field 410 holds data that indicates the first portion of the user credentials. For example, in the illustrated embodiment, the first portion of user credentials field 410 includes a user identifier (ID) field 412 and a first part of password field 414. The user ID field 412 holds data that indicates a user identifier, such as the text entered into the USER NAME text box 742. The first part of password field 414 holds data that indicates a first part of a password, such as the first four characters of text entered into the PASSWORD text box 744.

The service request field 420 holds data that indicates a request for some service provided by the network service 110 that receives the message 400, such as a request for a home page or contacts list or settings page for the user of the service 110. In some embodiments the service request field 420 is omitted.

When the accelerated authentication agent 134 receives the first portion of the user credentials, that first portion is sent to the accelerated authentication module 130 (e.g., via the API 132 or authentication service 120) in one or more messages 321.

The accelerated authentication module 130 checks the first portion of the user credentials against the contents of the authentication data store 122 in process 323 that can take hundreds of milliseconds. If the first portion fails (e.g., do not match, or match only a blocked or deadbeat user's credentials), then a failure message (not shown) is sent to the agent 134 which sends a rejection message (not shown) to the client 136 for presentation to the user.

If the credentials succeed (i.e., do not fail), then success message 331 is returned. In the illustrated embodiment, the success message includes the user token and data that indicates a valid value for the second portion of the user's credentials. In embodiments that use less than a full user name in the first portion, multiple candidate usernames do not fail in some cases. In such cases multiple valid values for the second portions are included in one or more success messages 331.

Figure 4B:
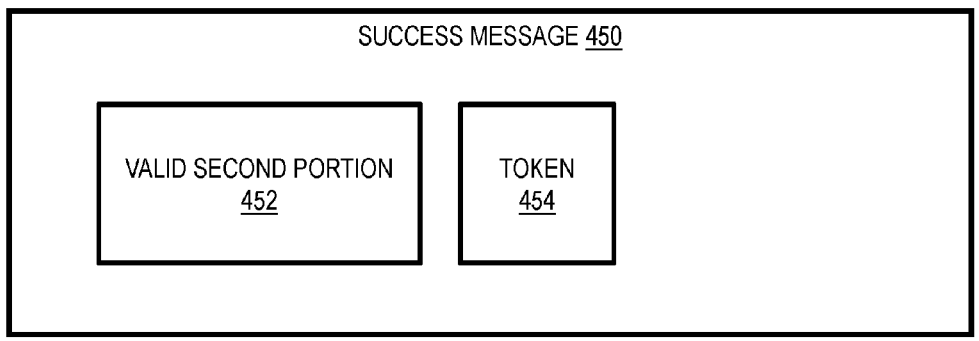
FIG. 4B is a diagram of an authentication success message, according to one embodiment.

FIG. 4B is a diagram of an authentication success message 450, according to one embodiment. Authentication success message 450 is a particular embodiment of messages 331. The success message 450 includes a valid second portion field 452 and a token field 454.

The valid second portion field 452 holds data that indicates a valid value for the second portion of the user credentials such as a valid value for a second part of the password. In some embodiments, the field 452 holds a transformation of the valid value, such as hashed value or otherwise encrypted value. A transformed value can still be used to compare a second portion entered by a user if the comparing process knows the transform or an inverse transform. The inverse transform is used to derive the valid value of the second portion from the value in field 452. The transform is used transform a value entered by the user to a value (such as a hash value) that can be compared to the transformed value in field 452. In example embodiments using encryption, the hash is combined with a shared secret or securely transmitted key value or the inverse transform is based on a shared secret or securely transmitted key.

The token field 454 holds data that indicates the token that can be used for further requests from the same user to the set of services 110 that share authentication. In some embodiments, the data in the token field 454 is also transformed.

In the illustrated embodiment, while process 323 proceeds on module 130, a process 325 is performed by the agent 134 on service 110 based on the user name in the first portion. For example, service 110 takes hundreds of milliseconds to retrieve a user profile from user profile data store 112 in which the user name matches the user name in the first portion. User profile retrieval is performed because it is expected that any user-aware response makes use of at least some data in the user profile. If multiple candidate user names are possible, the retrieval of all candidate user profiles commences during process 325. In some embodiments, process 325 is omitted. An advantage of including process 325 is to make use of the time between sending the first portion in messages 321 and receiving the response in messages 331 to perform tasks that would be performed later while a user is waiting for a response. This reduces waste of processing capacity at the agent 134 and the client 136.

During or after process 325, the success messages 331 are received. The success messages 331 indicate that the first portion of the user credentials is valid. In some embodiments, the first portion of the user credentials is sufficient to authorize some service response. For example, consumer internet services typically support multiple levels of access controls, such as one level of access controls for accessing emails and more strict access controls for modifying profile settings on an online email service. Similarly, downloading applications are subject to a first level of access controls, while buying applications from an application store are subject to more strict access controls. Typically, normal operations like accessing emails and downloading applications are much more frequent than advanced operations like modifying profile settings and buying applications. In some embodiments, the less strict access controls are used for the more frequent operation. In some of these embodiments, the first portion of the user credentials is sufficient to satisfy the less strict access controls for the more frequent operations (e.g., the first portion is defined to include the first part of the password that is sufficient to satisfy the first level of access control).

If the service requested is authorized by the first portion, then in process 333 the requested service is completed; and, in one or more messages 335 the response to the requested service is delivered to the client 114 or browser 107. Note that the service is allowed to be delivered before the process 213 is completed, e.g., before the user activates the SUBMIT button 732.

Figure 4C:
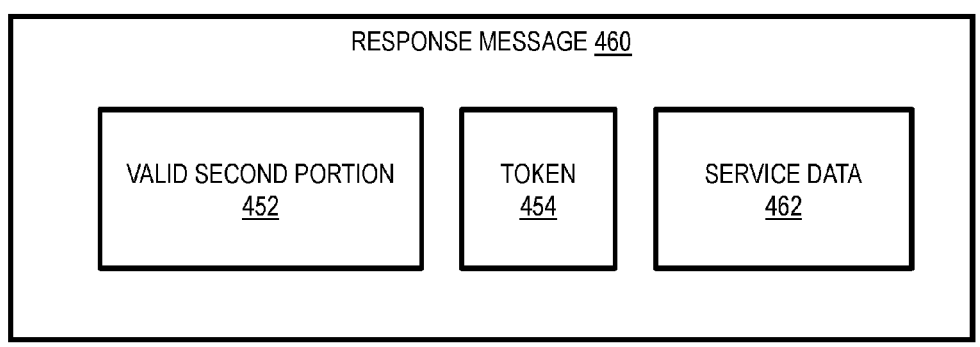
FIG. 4C is a diagram of a service response message, according to one embodiment.

FIG. 4C is a diagram of a service response message 460, according to one embodiment. The response message 460 includes a valid second portion field 452 and token field, both as described above with reference to FIG. 4B, and a service data field 462.

The service data field 462 holds data that is provided in response to a service request, such as indicated in service request field 420. For example, service data field 462 holds data that indicates some or all of a home page for the user of UE 101 in a service 110. In some embodiments, if no service is requested in field 420, or if field 420 is omitted, then field 462 is empty or omitted.

In the some embodiments, the valid second portion field 452 and token field 454 are not included in message 345 to the client 136, unless the client process is a trusted client, as described in more detail below with reference to FIG. 3B.

When the process 213 is completed, e.g., when the user activates the SUBMIT button 732, the second portion of the user credentials are submitted in one or more messages 341. In some embodiments, the messages 341 include one message per character and a final message indicating end of credentials. At this time the user of UE 101, on which the client 134 is executing, is waiting for a response and unlikely to initiate another application on the UE 101, thus wasting capacity on UE 101.

In the process 343, the accelerated authentication agent 134 checks locally the second portion provided in messages 341 and the valid value received in messages 331. Thus an exchange of messages 221 and 231 (or 321 and 331) with the authentication service 120 (or module 130), and one or more lookups of a large data store 122 and corresponding checks during process 223 (or 323) are avoided while the user is waiting.

If, during process 343, the second portion provided in messages 341 fails in comparison with the valid value received in messages 331, then authentication fails; and, a fail message (not shown) is returned to the client 114 or browser 107 (e.g., through client 136).

However, if during process 343 the second portion provided in messages 341 does not fail in comparison with the valid value received in messages 331, then authentication succeeds; and, one or more response messages 345 are returned to the client 114 or browser 107 (e.g., through client 136). In the illustrated embodiment, the response messages 345 include the user token and the service response authorized by the complete user credentials, but not the valid value for the second portion. In some embodiments, one or both of the user token and authorized service response are omitted. The valid second portion field 452 of response message 460 is omitted from messages 345 because the client 136 is not a trusted client.

Subsequent requests for service from any related service 110 are sent in one or more request messages 347. In the illustrated embodiment, the request messages 347 include the user token.

For reference, the delay 240 experienced during the process of FIG. 2A is depicted in FIG. 3A as a dashed double arrow. The response messages 345 are received after the end of process 213 (e.g., user activation of the SUBMIT button 732) by a delay 352 that is much less than the delay 240, thus wasting much less capacity on the UE 101 where the client 136 is executing. This is because messages 315, 317, 321, 331 are sent and processes 323, 325 and 333 are performed in advance of the end of process 213, instead of after the end of process 213. Thus, during a time interval given by a difference between delay 240 and delay 352, the capacity of UE 101 is not wasted, but, instead, may be utilized, thereby increasing the computational efficacy of UE 101. Authentication is accelerated, but to a lesser degree, even in embodiments in which only a few of messages 315, 317, 321 and 331 are sent before the end of process 213, or one or neither of processes 325 and 333 are performed before the end of process 213.

As described above, in some embodiments, the service requested is authorized by the first portion of the user credentials. If the first portion is valid in such embodiments, then the service requested is delivered in one or more messages 335 that are received well in advance of messages 345 that carry the user token or other services that are based on full user credentials. In such embodiments, the delay is much less than delay 352. In the illustrated embodiment, the service authorized by the first portion is received in messages 335 before the end of process 213 by an advanced time 350. Thus, during an entire time interval of advance 350 plus delay 240 combined, the capacity of UE 101 is not wasted, but, instead, may be utilized, thereby increasing the computational efficacy of UE 101.

FIG. 3B is a time sequence diagram 302 of accelerated authentication, according to another embodiment. The processes represented in FIG. 3B include trusted accelerated authentication client 304 serving as accelerated authentication client 136 in client 114, accelerated authentication agent 134 in network service 110, and accelerated authentication module 130 in authentication service 120. In this embodiment, the accelerated authentication client 304 is trusted to ensure that data received from the first user substantively agrees with the second portion of user credentials for the first user before releasing the user token and any service data authorized by full credentials.

If the client application 136 is a trusted client 304, both the token and a valid value for the second part of the password are returned to the client application 304 (e.g., directly from authentication module 130 or indirectly through agent 134), e.g., in fields 452 and 454, respectively, of response message 460. The client 304 won't release the user token until the client 304 has verified that all characters that the user gave are correct. This verification is fast because there is no network roundtrips involved. Application authentication, e.g., PlatformAttestation page in the WSecurity directory of the wikis.in subdomain of the nokia domain with com extension on the World Wide Web, provides an example method for the accelerated authentication service module 130 or agent 134 to verify whether the client 136 is a trusted client 304 or not. Alternatively, to further improve security, the accelerated authentication module 130 causes the authentication service 120 to return some random data encrypted by the correct credentials (e.g. using page Authenticated_encryption in the above directory), such as the full password. If the client can successfully decrypt the authenticated-encryption using the user-provided full password, then it knows that the password is correct. In this case, the password is not exposed to client 304; however, the client 304 is trusted not to do dictionary attacks.

In FIG. 3B, the messages 211, 315, 317, 321, 331 and processes 213, 323, 325 and 333 are as described above. One or more messages 335 are replaced by one or more messages 361 that include the token and second portion of the user credentials along with any service data authorized by the first portion, such as in service response message 460. In some embodiments, no service data is authorized by only the first portion and the service data field 462 is empty or omitted from messages 361.

In the illustrated embodiment, the processing of a request authorized by the full user credentials, if any, begins in process 367 in anticipation of a successful authentication by the trusted client.

When the process 213 is completed, e.g., when the user activates the SUBMIT button 732, the second portion of the user credentials are not sent in one or more messages to the authentication module 130 or the agent 134. Instead, during new process 363, the second portion of the user credentials is compared locally on trusted client 304 with the valid value received in the one or more messages 361. Any method can be used, including comparing the values directly, inversely transforming the data received in message 361, or transforming the data input by the user during process 213, or some combination. If the comparison fails, e.g., there is no match, then a failure notice (not shown) is displayed on the UE 101.

If it is determined during process 363 that the comparison does not fail, then the user token is released to the client 114 or browser 107 to support further request for service from one or more network services 110. If a request authorized by the full user credentials has already been sent, e.g., in field 420, then in one or more messages 365, the user token is sent to the agent 134, thereby notifying the agent 134 of the successful authentication. Process 367 is completed by checking that the token agrees with the token received from the accelerated authentication module 130 in one or more messages 331. When process 367 is sufficiently completed, one or more response messages 369 that include service data authorized by the full user credentials are sent to the client 114 or browsers 107 (e.g., directly or indirectly through trusted client 304).

Subsequent requests for service from any related service 110 are sent in one or more request messages 347, as in FIG. 3A. In the illustrated embodiment, the request messages 347 include the user token.

For reference, the delay 240 experienced during the process of FIG. 2A is depicted in FIG. 3B as a dashed double arrow. Similar to the sequence depicted in FIG. 3A, the response messages 369 are received after the end of process 213 (e.g., user activation of the SUBMIT button 732) by a delay 354 that is much less than the delay 240. Because the check for the second portion is done locally on the client 304 in process 363, additional time is saved because messages need not be exchanged with the agent 134 to check the second portion. Thus, delay 354 is likely to be even less than delay 352 of the sequence depicted in FIG. 3A.

As described above, in some embodiments, the service requested is authorized by the first portion of the user credentials. If the first portion is valid in such embodiments, then the service requested is delivered in one or more messages 361 that are received well in advance of messages 345 that carry the user token or other services that are based on full user credentials. In such embodiments, the delay is much less than delay 354. In the illustrated embodiment, the service authorized by the first portion is received in messages 361 before the end of process 213 by an advanced time 350, substantively the same as depicted in FIG. 3A.

Figure 9:
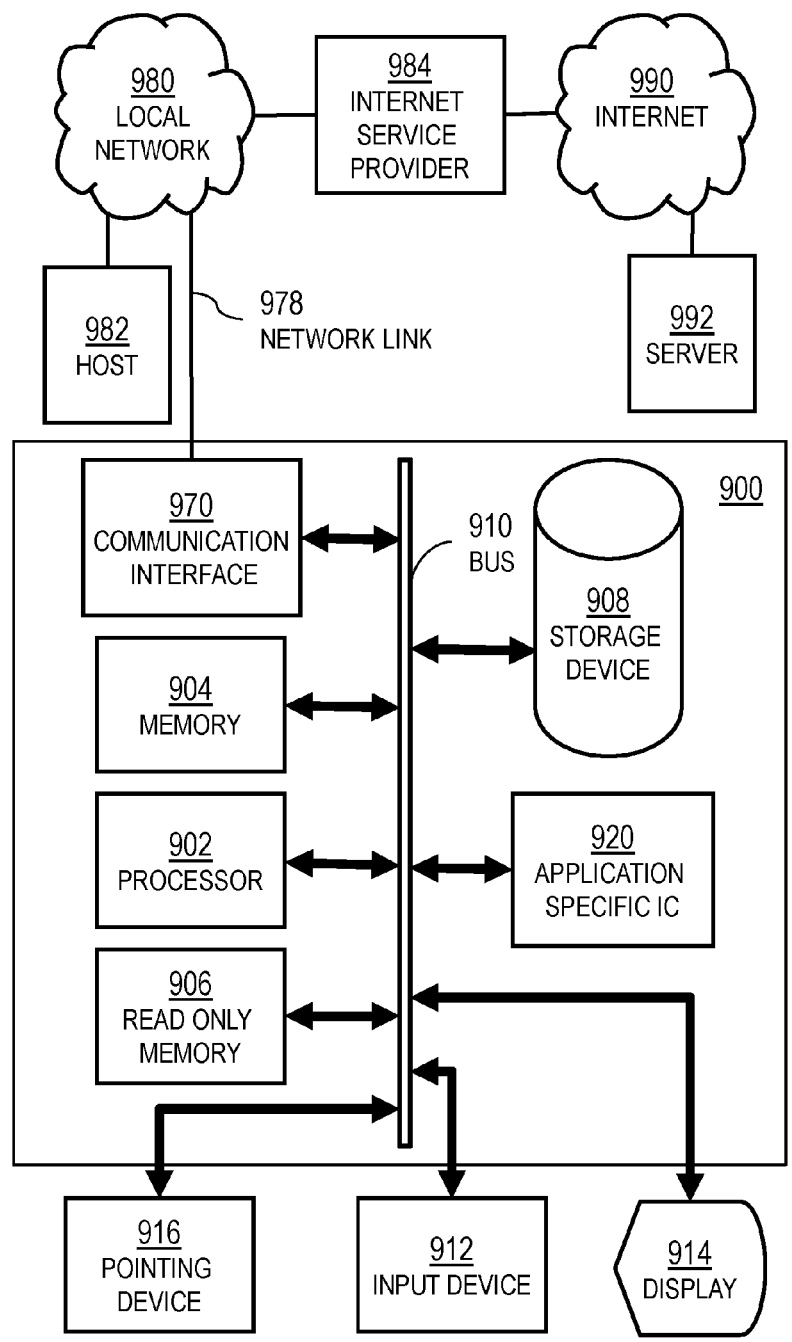
FIG. 9 is a diagram of hardware that can be used to implement an embodiment of the invention.
Figure 10:
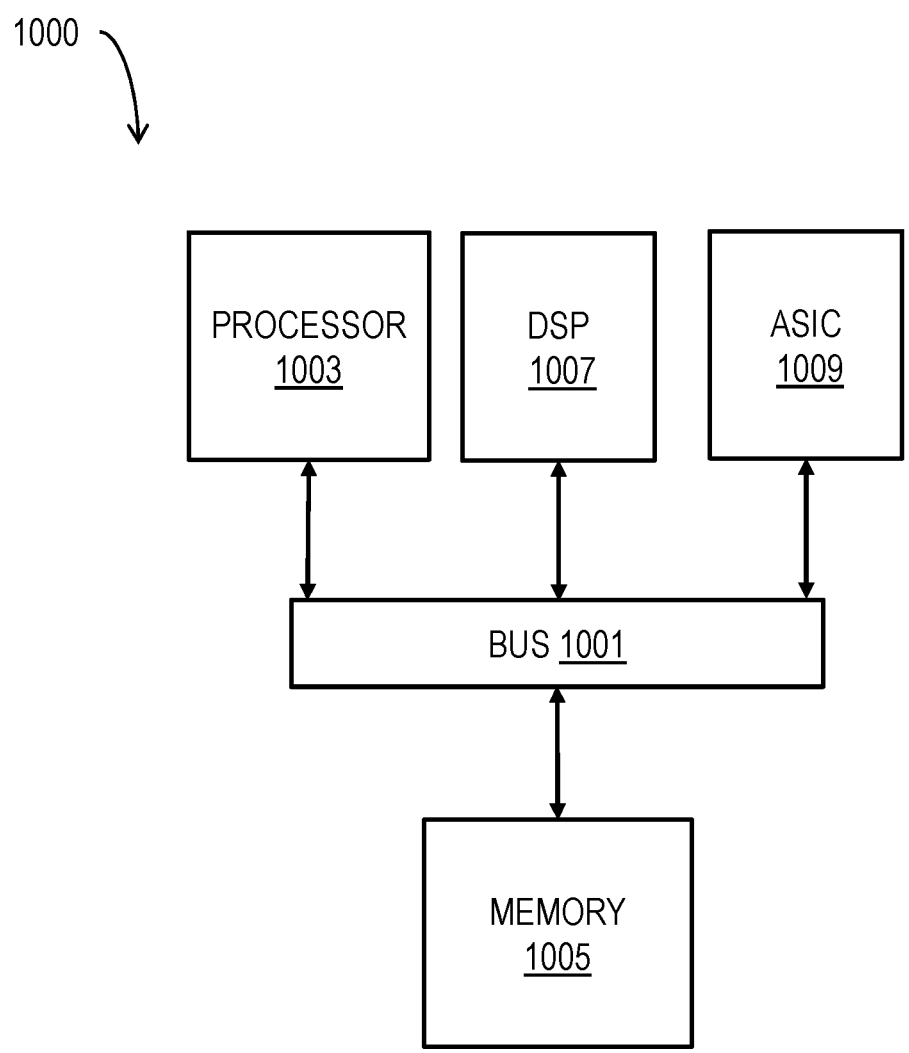
FIG. 10 is a diagram of a chip set that can be used to implement an embodiment of the invention.

FIG. 5 is a flowchart of an accelerated authentication service process 500, according to one embodiment. In one embodiment, the accelerated authentication module 130 performs the process 500 and is implemented in, for instance, a chip set including a processor and a memory as shown in FIG. 10 or general purpose computer as depicted in FIG. 9.

In step 501, an authorization request message is received. In step 503 it is determined whether the message includes full credentials, as in legacy systems. If so, then in step 505 the success of the authentication is determined as defined in the legacy system and the success or failure is sent in a notification message according to the legacy system. Control then passes to step 531 to determine whether end conditions are satisfied, e.g., the service is shutting down. If so, the process ends, otherwise the process continues at step 501 to receive the next message.

However, if it is determined in step 503 that full credentials are not included, then control passes to step 511. For example, in step 503, it is determined that a message similar to request message 400 is received, but without field 420, from accelerated agent 134 or from accelerated authentication client 136 redirected to the module 130. The message includes only the first portion of the user credentials and is missing the second portion, e.g., the second part of the password. Thus step 503 includes receiving first data that indicates a first portion of user credentials for a first user but not a second portion of user credentials for the first user, wherein user credentials are used to authenticate a user. As described above, in some embodiments, the first portion is a predetermined portion of the user credentials, e.g., the entire user name and the first four characters of the password. In this and some other embodiments, the first portion comprises data that indicates a user identifier for the first user and data that indicates part of a password for the first user; and the second portion comprises data that indicates a remaining part of the password.

In step 511, the validity of the first portion of credentials is determined. For example, during process 323 described above, the first portion of the user credentials are compared to the corresponding portion in one or more records in the authentication data store 122. If the first portion does not match any user or matches only users who are blocked or deadbeat or otherwise prevented access, then the first portion is not valid. Thus, step 511 includes determining whether the first portion of user credentials is valid.

In step 513, flow branches based on the validity of the first portion. If not valid, then in step 515 a fail message is sent to the agent 134 or to the client 136. Control passes to step 531 to determine if end conditions are satisfied, as described above.

If the first portion is valid, then in step 521 a valid value for second portion of the user credentials is prepared for sending to the agent 134 or client 136. For example, in the illustrated embodiment, the valid value for the second portion is encrypted, e.g., by hashing with a shared secret or by hashing a shared value with a number that includes the second portion, e.g., the correct full password that includes the second part of the password. Thus, step 521 includes determining to send second data that indicates a valid value for the second portion of user credentials for the first user if the first portion of user credentials is valid. In some embodiments, the second data indicates an encrypted version of the valid value for the second portion of user credentials for the first user. The encrypted version of the valid value for the second portion of user credentials for the first user is used by a remote process (either agent 134 or trusted client 304) to verify data received from the first user.

In step 523, an authorization token to be used by this user for a predetermined time (e.g., four hours) is determined. For example, a unique random number is selected and stored in the authorization data store in association with an expiration time four hours in the future. The unique random number is used as the token for this user. The second data therefore includes a token that is used by the first user to obtain service from a set of one or more network services for a predetermined time interval. In some embodiments, accelerated authorization is done each time the user makes a new request; and a token is not used or included in the second data.

In step 525, the module 130 determines to send a message indicating a successful authentication result. The message includes the token and data indicating the valid value for the second portion, such as the encrypted value. For example, the module 130 causes the success message 450 to be sent to the agent 134 or client 136. Control then passes to step 531, described above. The remote process that receives the second data indicating the valid value for the second portion is an agent 134 of network service 110, and in some embodiments, a trusted client 304 on UE 101, each of which can be trusted to ensure that data received from the first user substantively agrees with the valid value for the second portion of user credentials for the first user. Thus, in some embodiments, the remote process is a network service configured to provide a service to the first user; and, in some embodiments, the remote process is a client process on a device operated by the first user.

Figure 11:
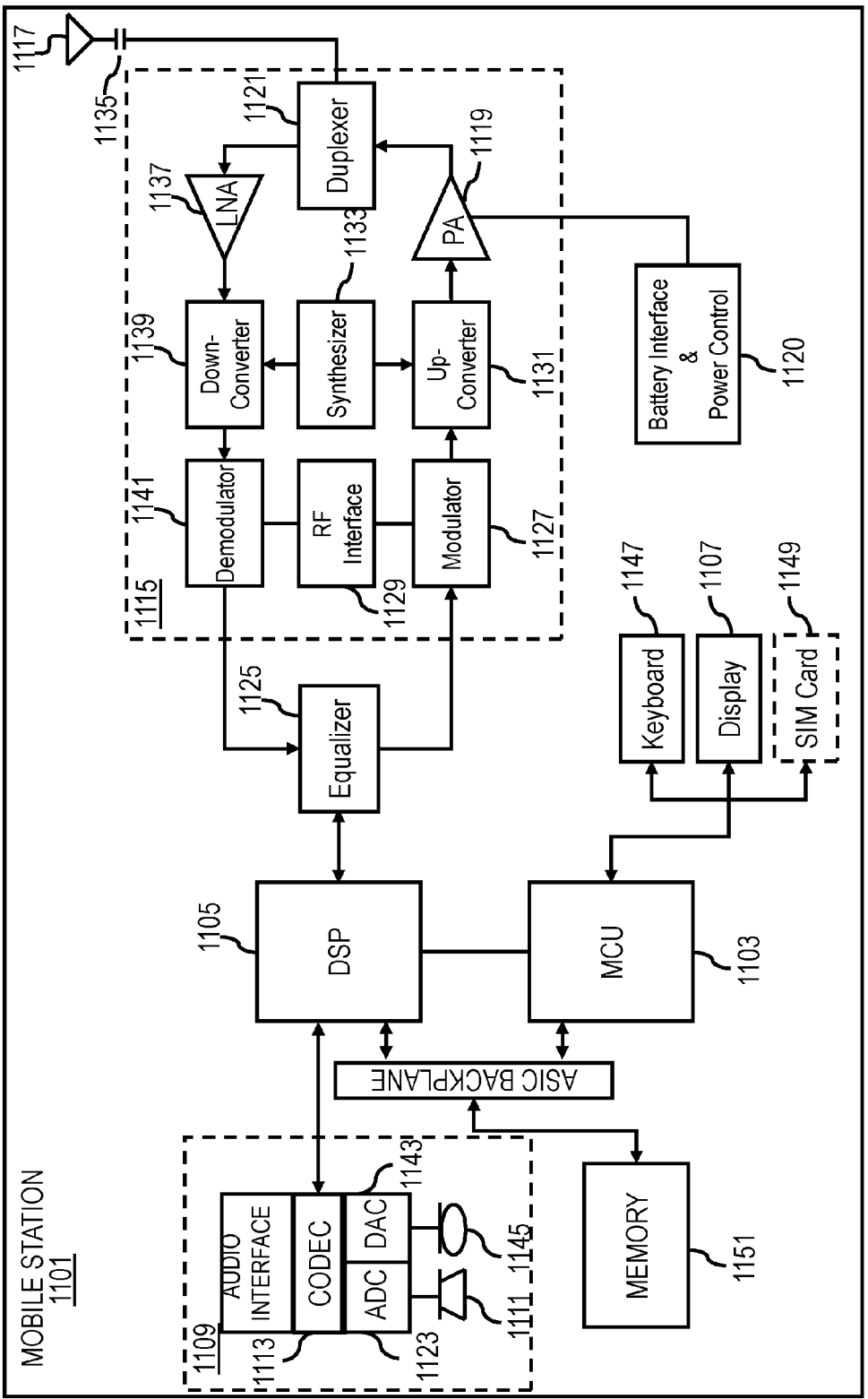
FIG. 11 is a diagram of a mobile terminal (e.g., handset) that can be used to implement an embodiment of the invention.

FIG. 6 is a flowchart of an accelerated authentication client process 600, according to one embodiment. In one embodiment, the accelerated authentication client 136 performs the process 600 and is implemented in, for instance, a chip set including a processor and a memory as shown in FIG. 10 or mobile terminal as depicted in FIG. 11.

In step 601, a prompt for a user's sign in credentials is determined and caused to be presented, e.g., on UE 101. For example upon contacting the service 110 from the client 114 or browser 107, authentication UI area 730 is received for presentation on a display of the UE. Step 601 includes causing the authentication UI area 730 to be presented. During step 601, the process ends if the user cancels the sign in procedure, e.g., by activating the CANCEL button 734.

In step 603 a secure data session is initiated, even before the user has completed entering data in response to the prompt, e.g., even before the user has finished entering the first portion of the user credentials into the authentication UI area 730. For example, messages 315 are exchanged to set up a secure session between the client 136 and the agent 134 or module 130, as described above.

In step 605 the next character input by the user in response to the sign in prompt is received. For example, the next character input into USER NAME text box 742 or PASSWORD text box 744 is received.

In step 607, it is determined whether the first portion is complete. For example it is determined if the user's typing has hesitated, or whether the user name is complete, or, in the illustrated embodiment, whether the user name is complete and the first four characters of the password have been entered. If not, control passes back to step 605 to receive the next character input by the user.

If it is determined in step 607 that the first portion is complete, then in step 609 a first authentication message is sent that includes the first portion but not the second portion of the user credentials. For example, request message 400 is sent with the first portion of the user credentials in field 410. In some embodiments, the first authentication message includes an optional request for service, e.g., a request for a user's home page or contact list in field 420 of request message 420. Thus, step 609 includes receiving first data that indicates a first portion of user credentials for a first user but not a second portion of user credentials for the first user, wherein user credentials are used to authenticate a user. Step 609 further includes determining to send a first message that indicates the first portion of user credentials to a remote process that initiates authentication of the first user based on the first portion of user credentials before receiving second data that indicates the second portion of user credentials for the first user. In some embodiments, the first message sent during step 609 further indicates a request for a service from the remote process.

In step 611 the next character input by the user in response to the sign in prompt is received. For example, the next character input into USER NAME text box 742 or PASSWORD text box 744 is received.

In step 613, it is determined whether service data is received. For example, service data authorized by the first portion of the user's credentials may be received in one or more messages 335 or 361 before the user has finished entering the second portion of the user credentials. If so, then in step 615 the service data is used, e.g., to prepare and present content, such as a user home page or contact list, for the application UI area 720 behind the authentication UI 730. Thus step 613 includes receiving service data from the remote process in response to the request, if the first portion of user credentials for the first user is valid and the first portion is sufficient to obtain the service data.

In step 617, it is determined whether the second portion is complete. For example it is determined if the user activated the SUBMIT button 732. If not, control passes back to step 611 to receive the next character input by the user.

If it is determined in step 617 that the second portion is complete, then the next steps, to determine if the second portion entered by the user is valid, are determined by whether the client is a trusted client or not, as indicated by branch point 619. If not a trusted client, control passes to step 621 and following, described next, to determine if the second portion is valid; and, in some embodiments, steps 631 through 635 are omitted. If a trusted client, control passes to step 631 and following, described further below, to determine if the second portion is valid; and, in some embodiments, steps 621 to 625 are omitted. In either case, step 609 comprises receiving the second data that indicates the second portion of user credentials for the first user. The following steps determine whether the second data is valid in response to receiving the second data.

In step 621, the untrusted client sends a second authentication message with the second portion of the user credentials. For example, one or more messages 341 are sent to the accelerated authentication agent 134 on service 110. Thus step 621 includes determining to send a second message that indicates the second portion of the user credentials to the remote process.

In step 623, it is determined whether a failure notification message is received. If so, control passes back to step 601, described above, to prompt the user to enter user credentials. If not, then in step 625 a success message is received. The success message includes the user token and any optional service data that is authorized by the full user credentials. For example, one or more messages 345 are received from the accelerated authentication agent 134 on service 110. Thus, step 625 includes determining whether the remote process returns third data that indicates successful authentication in response to the second message.

In step 637, the service data authorized by the full user credentials, if any, is presented, e.g., in application UI area 720, such as email settings to be altered. Step 637 includes sending further service request messages that include the user token, such as messages 347, to one or more services 110. Step 637 includes removing any sign in prompts, e.g., closing authentication UI area 730 if it is still being presented. Control then passes to step 641 to determine whether end conditions are satisfied, e.g., whether the user has activated CLOSE button 724 or the user token has expired. If so, the process ends. Otherwise, control passes back to step 637 for sending further service request messages that include the user token.

In step 631, executed if the client is a trusted client, it is determined whether a failure notification message is received, e.g., from the agent 134. If so, control passes back to step 601, described above, to prompt the user to enter user credentials. If not, then in step 633 one or more response messages 361 are received from the accelerated authentication agent 134 on service 110. The response messages 361 include the user token, data that indicates a valid value for the second portion, and any optional service data that is authorized by the full user credentials. For example, response message 460 is received with the user token in field 454, an encrypted value that indicates a valid value for the second portion in field 452, and any service data in field 462. Thus, step 633 includes receiving third data from the remote process that indicates a valid value for the second portion of the user credentials.

In step 635, it is determined whether the second portion of the user credentials entered by the user is valid by comparing to the data in field 452 that indicates a valid value. The trusted client can be trusted to ensure this comparison is done correctly. Any method may be used to make this determination, as described above. If the user input is not valid, then control passes back to step 601 to determine the sign in prompt to present, e.g., to continue to present authentication UI area 730. Thus, step 635 comprises determining whether the second data from the user is consistent with the third data from the remote process, e.g., from the agent 134 or module 130.

If it is determined, in step 635, that the second portion of the user credentials entered by the user is valid, then, in step 637 the user token is used to make further requests, and any request data is presented, e.g., in application UI area 720, and the sign in prompts are removed, e.g., authentication UI area 730 is closed, as described above.

Figure 8:
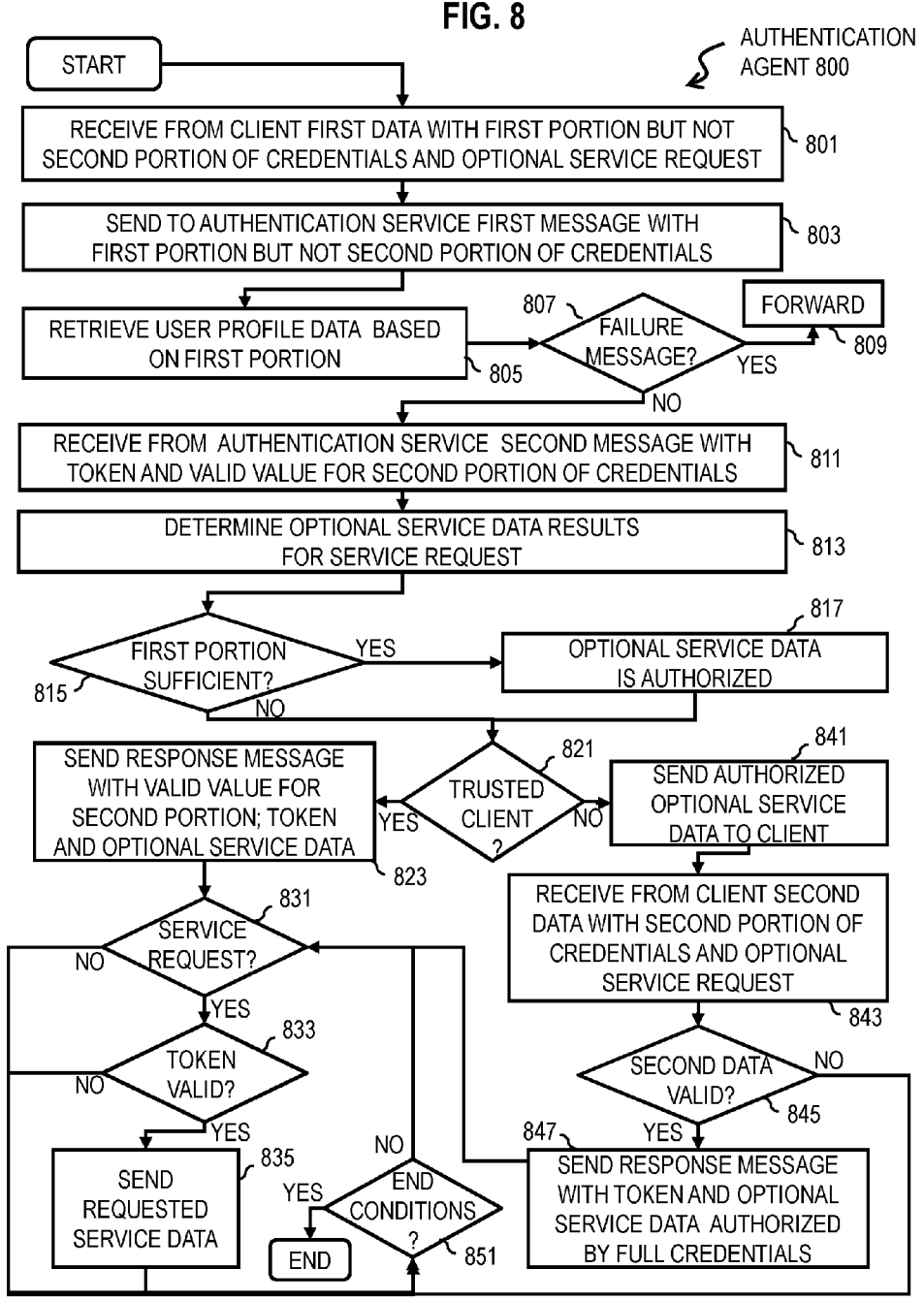
FIG. 8 is a flowchart of an accelerated authentication agent process, according to one embodiment.

FIG. 8 is a flowchart of an accelerated authentication agent process 800, according to one embodiment. In one embodiment, the accelerated authentication agent 134 performs the process 800 and is implemented in, for instance, a chip set including a processor and a memory as shown in FIG. 10 or general purpose computer as depicted in FIG. 9.

In step 801 first data with the first portion of the user credentials but not the second portion of the user credentials are received from the client process, e.g., received from accelerated authentication client 136 in client 114. For example, request message 400 is received from the client in one or more messages 317 with the first portion of user credentials in field 410. Thus step 801 includes receiving first data that indicates a first portion of user credentials for a first user but not a second portion of user credentials for the first user, wherein user credentials are used to authenticate a user. In some embodiments, the message 400 includes a request for a service in field 420. Thus, the first data received from the client 136 further indicates a request for service.

In step 803, a first message is sent to the authentication service, e.g., to accelerated authentication module 130 in authentication service 120. The first message includes data that indicates the first portion of the user credentials but does not indicate the second portion of the user credentials. For example, one or more messages 321 are sent from agent 134 to module 130 with field 410 from the request message 400. Thus, step 803 comprises determining to send a first message that indicates the first portion of user credentials to a remote process, e.g., the accelerated authentication module 130, that initiates authentication of the first user based on the first portion of user credentials before receiving second data that indicates the second portion of user credentials for the first user. (The second data is either received later, as described below with reference to step 843 for an untrusted client, or not received at all if a trusted client. In either case the first message is sent before a second portion is received.)

In step 805, while waiting for an authentication notification message, the agent begins attending to the request. For example, during process 325, user profile data is retrieved from a user profile data store 112 based on a user name, or portion thereof, in the first portion of the user credentials. Thus, step 805 includes determining to retrieve local user profile data for the first user based, at least in part, on a user identifier in the first portion of user credentials for the first user before receiving second data that indicates the second portion of user credentials for the first user.

In step 807, it is determined whether a failure notification message is received, e.g., from the module 130. If so, then, in step 809, the failure message is forwarded to the client, e.g., to client 136, and the process ends. If not, then, in step 811, a second message is received from the authentication service. The second message includes data that indicates the user token and a valid value for the second portion of the credentials. For example, one or more messages 331 are received, such as success message 450 with possibly encrypted data indicating the valid value for the second portion in field 452 and the user token in field 454. Thus step 811 includes receiving, from the remote process (e.g., accelerated authentication module 130), a second message that includes data that indicates a valid value for the second portion of the user credentials for the first user if the remote process (module 130) determines that the first portion of user credentials for the first user is valid. Furthermore, the second message received during step 811 includes a token that indicates the first user is authenticated for a predetermined time interval.

In step 813 optional service data is determined as a result of the optional request included in the first data received from the client. In step 815, it is determined whether the first portion of the user credentials is sufficient to authorize the presentation of this service data to a user of the client. If so, then in step 817, the optional service data is considered authorized for sending to the client in the next message to the client. Thus, step 817 includes determining to send service data to the different remote process executing on the device operated by the first user (e.g., accelerated authentication client 136 on UE 101), if the service data is authorized by the first portion of user credentials and if the remote process determines that the first portion of user credentials for the first user is valid.

The next steps are determined by whether the client is a trusted client or not, as indicated by branch point 821. If a trusted client, control passes to step 823, described next, and, in some embodiments, steps 841 through 847 are omitted. If not a trusted client, control passes to step 641, described further below, and, in some embodiments, step 823 is omitted. Steps 831 through 851 are performed for both trusted and untrusted clients.

In step 823, the agent sends to the trusted client a response message with data indicating a valid value for the second portion of the user credentials, the user token, and any service data authorized by the first portion of the user credentials. For example, one or more response messages 361 are sent to the accelerated authentication trusted client 304. For example, response message 460 is sent to the client with data indicating the valid value for the second portion in field 452, the user token in field 454, and the optional service data authorized by the first portion in field 462. Thus step 813 includes determining to send, to the different remote process (e.g., accelerated authentication client 136), a third message that indicates the valid value for the second portion of the user credentials for the first user in response to receiving the second message with the valid value from the remote process (e.g., module 130). Furthermore, the third message sent during step 823 includes the user token. Step 823 further includes determining to send service data to the different remote process executing on the device operated by the first user (e.g., accelerated authentication client 136 on UE 101), if the service data is authorized by the first portion of user credentials and if the remote process determines that the first portion of user credentials for the first user is valid.

In step 831, it is determined if a next service request (e.g., a first request after the optional request, if any) is received. For example, it is determined if one or more messages 347 are received. If not, control passes to step 851 to determine whether end conditions are satisfied, e.g., whether the network service 110 that includes the agent 134 is shutting down. If so, the process ends. Otherwise, control passes back to step 831 to determine whether a next request message is yet received.

If it is determined, in step 831, that a next service request message is received, then in step 833 it is determined if the token is valid. For example, it is determined that the token is among those stored by the agent and has not expired; and is therefore valid. If the token is not valid, then control passes to step 851 again to determine if end conditions are satisfied, as described above. If the token is valid, then, in step 835 the requested service data is sent to the client, e.g., to client 114 or browser 107 directly or indirectly via accelerated authentication client 136. Control then passes to step 851 as described above.

If the client is not a trusted client, then, in step 841 any service data authorized by the first portion of the user credentials is sent to the client. For example, one or more messages 335 are sent to the accelerated authentication untrusted client 303. Thus, step 841 includes determining to send service data to the different remote process executing on the device operated by the first user (e.g., accelerated authentication client 136 on UE 101), if the service data is authorized by the first portion of user credentials and if the remote process determines that the first portion of user credentials for the first user is valid.

In step 843, second data is received from the client. The second data indicates the second portion of the user credentials input by the user, alone or with an optional service request. For example, one or more messages 341 are received from the untrusted client 303. Thus step 843 includes receiving the second data that indicates the second portion of user credentials for the first user.

In step 845, it is determined whether the second data is valid (e.g., whether the second portion of the user credentials, such as the second part of the password, is valid) by comparing to the data in field 452 that indicates a valid value. The untrusted client 303 cannot be trusted to ensure this comparison is done correctly, so it is done by the accelerated authentication agent 134 which is trusted by the service 110 that includes the agent 134. Any method may be used to make this determination, as described above. Thus, step 845 includes determining whether the second data is valid based at least in part on the data that indicates the valid value for the second portion of the user credentials for the first user.

If the second data is not valid, control passes to step 851 to check end conditions, as described above. If the second data is valid, then in step 847 the agent sends to the untrusted client 303 a response message with the user token, and any service data authorized by the full user credentials. Step 847 includes finishing the determination of the response to the request, e.g., in process 343. For example, one or more response messages 345 are sent to the accelerated authentication untrusted client 303. Control then passes to steps 831 and following, described above, to respond to further requests for service which include a user token. Thus, step 847 includes servicing a request for service received from the different remote process (e.g., client 136) if the second data is determined to be valid. Step 847 further includes determining to send, to the different remote process (e.g., client 136), a third message that includes the token if the second data is determined to be valid. If the first data received from the client 136 in step 801 included a request for service, then the third message sent during step 847 includes more secure service data authorized by both the first portion and the second portion of user credentials of the first user.

Utilizing one or more of the above methods, by the time the user is ready to submit the information on the authentication user interface area 730, the client application already has received the access token from the authentication server. When the client application uses the token to make the first request on the content server, the response will come very fast. In some embodiments, the service data in response to the first request included in the first message is already presented in the application user interface area 720.

The processes described herein for accelerated authentication may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to accelerate authentication as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of accelerated authentication.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to accelerated authentication. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for accelerated authentication. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for accelerated authentication, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for accelerated authentication with the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to accelerate authentication as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of accelerated authentication.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to accelerated authentication. The memory 1005 also stores the data associated with or generated by the execution of the inventive steps.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of accelerated authentication. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of accelerated authentication. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to accelerate authentication. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by a hardware processor from a user device, first data that indicates a first portion of user credentials for a first user but not a second portion of the user credentials for the first user;
   determining, by the hardware processor, whether the first portion of the user credentials is valid; and
   when the first portion of the user credentials is valid, then determining, by the hardware processor, to send a service response authorized by the first portion to the user device,
      wherein sending of the service response authorized by the first portion occurs before receiving the second portion of the user credentials from the user device.

2. The method of claim 1, wherein, the service response authorized by the first portion provides access control to the first user, and when the user device is a trusted client, a level of access control provided to the first user that is authorized by the first portion is less strict than the level of access control provided to the user by the second portion.

3. The method of claim 2, wherein, the service response authorized by the first portion is included in second data that is sent to the user device, and the second data further includes a valid value for the second portion of the user credentials for the first user and a token that is used by the first user to obtain service from a set of one or more network services.

4. The method of claim 1, wherein, when the user device is a trusted client, the service response authorized by the first portion is included in second data that is received by the user device, and the second data further includes a valid value for the second portion of the user credentials for the first user and a token that is used by the first user to obtain service from a set of one or more network services, and wherein the user device inhibits sending the token to obtain service from the set of one or more network services until all entries of the user credentials for the first user are verified as correct.

5. The method of claim 1, wherein, the user device is an untrusted client, and the method further comprises:
   after sending the service response authorized by the first portion to the user device, receiving the second portion of the user credentials for the first user; and
   when the second portion of the user credentials is valid, then determining, by the hardware processor, to send a further service response authorized by the second portion and a token to the user device,
wherein the service response authorized by the first portion and the further service response authorized by the second portion each provide a different level of access control to the first user,
wherein the further service response authorized by the second portion is a more strict level of access control than that provided by the service response authorized by the first portion, and
wherein the token is data that is used by the first user to obtain service from a set of one or more network services.

6. A method comprising:
receiving, by a hardware processor of a user device, first data that indicates a first portion of user credentials for a first user but not a second portion of the user credentials for the first user,
wherein the first data is received in response to a sign-in prompt to the first user to provide the user credentials to authenticate the first user;
before receiving second data that indicates the second portion of the user credentials for the first user, determining, by the hardware processor, to send a first message that indicates the first portion of the user credentials to a remote process that initiates authentication of the first user based on the first portion of the user credentials; and
receiving a service response authorized by the first portion,
wherein the receiving of the service response authorized by the first portion occurs before a submit button on the user device is activated to send the second portion of the user credentials from the user device.

7. The method of claim 6, wherein, the service response authorized by the first portion provides access control to the first user, and when the user device is a trusted client, a level of access control provided to the first user that is authorized by the first portion is less strict than the level of access control provided to the user by the second portion.

8. The method of claim 7, wherein, the service response authorized by the first portion is included in third data that is received by the user device, and the third data further includes a valid value for the second portion of the user credentials for the first user and a token that is used by the first user to obtain service from a set of one or more network services.

9. The method of claim 6, wherein, when the user device is a trusted client, the service response authorized by the first portion is included in third data that is received by the user device, and the third data further includes a valid value for the second portion of the user credentials for the first user and a token that is used by the first user to obtain service from a set of one or more network services, wherein the method further comprises:
inhibiting sending the token from the user device to obtain service from the set of one or more network services until all entries of the user credentials for the first user are verified as correct.

10. The method of claim 6, wherein, the user device is an untrusted client, and the method further comprises:
after receiving the service response authorized by the first portion, sending the second portion of the user credentials for the first user to the remote process; and
receiving a further service response authorized by the second portion and a token,
wherein the service response authorized by the first portion and the further service response authorized by the second portion each provide a different level of access control to the first user,
wherein the further service response authorized by the second portion is a more strict level of access control than that provided by the service response authorized by the first portion, and
wherein the token is data that is used by the first user to obtain service from a set of one or more network services.

11. An apparatus comprising:
at least one hardware processor; and
at least one memory including computer program code for one or more programs,
the at least one memory and the computer program code configured to, with the at least one hardware processor, cause the apparatus to at least:
receive first data that indicates a first portion of user credentials for a first user but not a second portion of the user credentials for the first user,
wherein the first data is received in response to a sign-in prompt to the first user at a user device to provide the user credentials to authenticate the first user;
before receiving second data that indicates the second portion of the user credentials for the first user, determine to send a first message that indicates the first portion of the user credentials to a remote process that initiates authentication of the first user based on the first portion of the user credentials; and
receive a service response authorized by the first portion,
wherein receiving of the service response authorized by the first portion occurs before a submit button on the user device is activated to send the second portion of the user credentials from the user device.

12. The apparatus of claim 11, wherein, the service response authorized by the first portion provides access control to the first user, and when the user device is a trusted client, a level of access control provided to the first user that is authorized by the first portion is less strict than the level of access control provided to the user by the second portion.

13. The apparatus of claim 12, wherein, the service response authorized by the first portion is included in third data that is received by the user device, and the third data further includes a valid value for the second portion of the user credentials for the first user and a token that is used by the first user to obtain service from a set of one or more network services.

14. The method of claim 11, wherein, when the user device is a trusted client, the service response authorized by the first portion is included in third data that is received by the user device, and the third data further includes a valid value for the second portion of the user credentials for the first user and a token that is used by the first user to obtain service from a set of one or more network services, wherein the apparatus is further caused to:
inhibit sending the token from the user device to obtain service from the set of one or more network services until all entries of the user credentials for the first user are verified as correct.

15. The apparatus of claim 11, wherein, the user device is an untrusted client, and the apparatus is further caused to:
after receiving the service response authorized by the first portion, send the second portion of the user credentials for the first user to the remote process; and
receive a further service response authorized by the second portion and a token, wherein the service response authorized by the first portion and the further service response authorized by the second portion each provide a different level of access control to the first user, wherein the further service response authorized by the second portion is a more strict level of access control than that provided by the service response authorized by the first portion, and wherein the token is data that is used by the first user to obtain service from a set of one or more network services.

* * * * *